July 24, 1923.
J. F. O'CONNOR
1,462,616
FRICTION SHOCK ABSORBING MECHANISM
Filed July 19, 1922
2 Sheets-Sheet 2
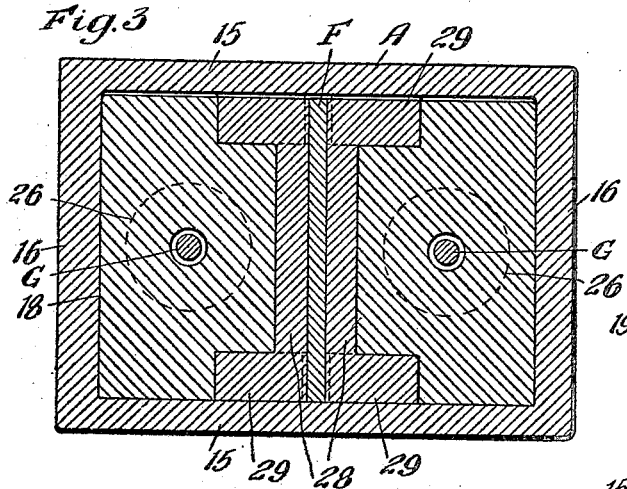
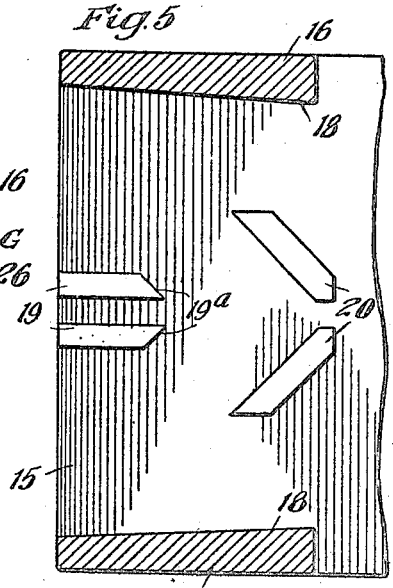
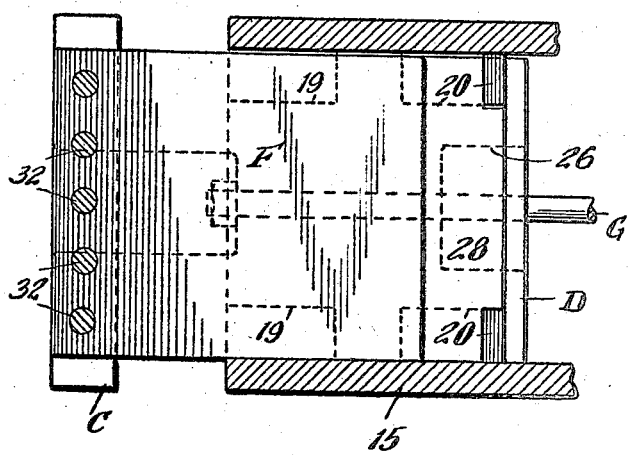
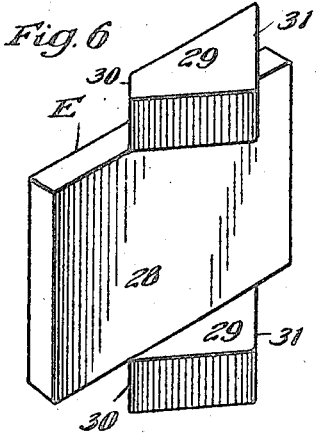
Witnesses
Wm. Geiger
Inventor
John F. O'Connor
By Geo. I. Haight
His Atty.

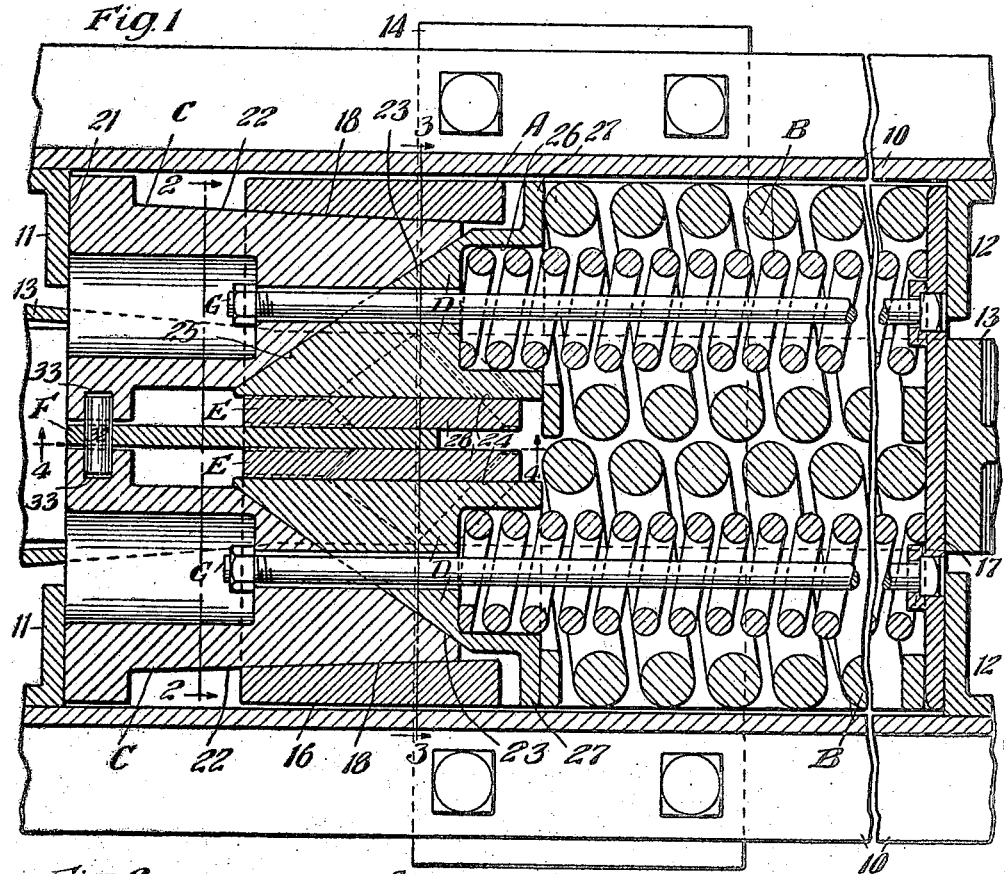
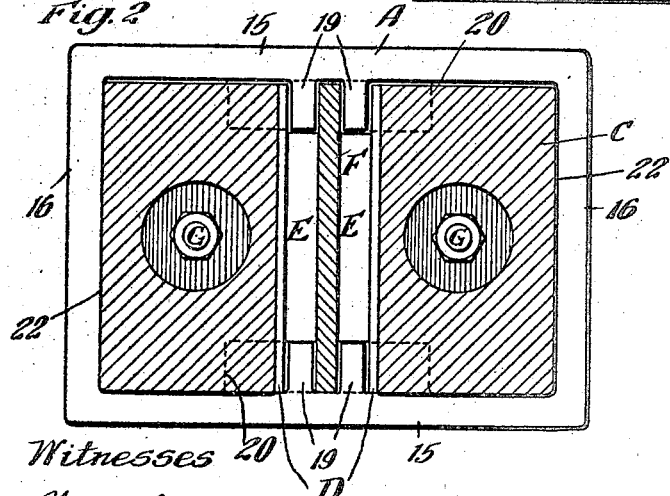

Patented July 24, 1923.

1,462,616

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed July 19, 1922. Serial No. 575,959.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a high capacity friction shock absorbing mechanism especially adapted for railway draft riggings and wherein a large amount of friction wearing areas is obtained.

More specifically, an object of the invention is to provide a friction mechanism of the character indicated wherein are employed twin arranged sets of friction generating devices combined with additional friction-creating elements all compactly arranged.

Other objects of the invention will more clearly appear from the description and claims hereinafter following.

In the drawings forming a part of this specification, Figure 1 is a horizontal longitudinal sectional view of a portion of a railway draft rigging showing my improvements in connection therewith. Figures 2 and 3 are vertical transverse sectional views of the shock absorbing mechanism proper, corresponding to the section lines 2—2 and 3—3 respectively of Figure 1. Figure 4 is a longitudinal vertical sectional view, parts being broken away, corresponding to the section line 4—4 of Figure 1. Figure 5 is a broken horizontal longitudinal sectional view of the friction shell showing the interior construction thereof, all movable parts being omitted. And Figure 6 is a detail perspective of one of the friction plates or elements employed in the mechanism.

In the drawings forming a part of this specification, 10—10 denote the usual channel draft sills of a car underframe, to the inner faces of which are secured front stop lugs 11 and rear stop lugs 12. The shock absorbing mechanism proper is inserted within a hooded cast yoke 13 by which the mechanism is adapted to be operatively associated with the usual drawbar, not shown. The yoke and mechanism therewithin are supported in operative position by a detachable saddle plate 14.

The improved shock absorbing mechanism proper, as shown, comprises a combined friction shell and spring cage casting designated generally by the reference character A; twin arranged springs B—B; twin arranged sets of friction devices each including a pressure-transmitting wedge-shoe C and a wedge-friction-shoe D; a pair of relatively stationary friction plates E—E; a relatively movable friction plate F; and twin arranged retainer bolts G—G.

The casting A, as shown, is of rectangular form, having top and bottom walls 15—15, side walls 16—16 and an integral rear wall 17, the latter functioning as the rear follower of the mechanism. The side walls 16—16 are comparatively short so as to leave the major portion of the casting open on the sides to permit of the insertion and removal of the springs and elements D—D. The inner faces of the side walls 16 provide longitudinally extending friction surfaces 18—18 which are converged rearwardly of the mechanism. The top and bottom walls of the casting A are also provided with opposed sets of laterally spaced longitudinally extending ribs 19—19 at the front or outer end thereof and also with opposed sets of top and bottom rearwardly converging ribs 20—20, as best shown in Figure 5, for the purposes hereinafter described.

Each of the wedge-pressure-transmitting friction shoes C has an outer flat bearing face 21 adapted to engage one of the stop lugs 11 and also a part of the butt end of the coupler. Each said member C is further provided on its outer side with a longitudinally extending friction surface 22 cooperable with the corresponding adjacent friction surface 18 and, at its inner end, with an inclined wedge surface 23. As shown in Figure 1, the two members C will together provide sufficient bearing area for the rear end of the coupler to admit of proper operation of the mechanism.

Each of the wedge-friction-shoes D is provided on its inner side, that is, the side nearest the center line of the mechanism, with a longitudinally extending friction surface 24 and also with an inclined wedge surface 25, the latter cooperating with a corresponding adjacent wedge surface 23. At its inner end, each member D is recessed or cut as indicated at 26 to provide a seat for the inner end of the inner coil of the two-coil spring B. Each member D is further provided with a laterally extended flange 27 at its inner end to thereby insure a sufficiently large bearing area for the outer heavy coil of the corresponding spring B.

The two friction plates E are of like construction and each is formed with a rectangular plate section proper 28 extending lengthwise of the mechanism and, on opposite edges thereof, with heavy lugs 29—29, the latter having parallel front and rear faces 30 and 31, which, when the plates E are in position in the shell A, are inclined rearwardly and toward the center line of the mechanism. The faces 31 cooperate with the front faces of the ribs 20 so that, as the plates E tend to move rearwardly under the frictional drag imposed thereon by the twin sets of friction elements and the plate F, the plates E will be pressed toward each other as they tend to travel down the inclined ribs 20—20. The faces 30 of the plates E are adapted to cooperate with the inclined ends 19ª of the ribs 19 to prevent the plates E being moved outwardly beyond their normal predetermined position. The plate sections 28 provide longitudinally extending friction surfaces on the inner and outer sides thereof cooperable with the friction plate F and friction surfaces 24, respectively. In normal position of the plates E, the outer ends thereof extend flush with the outer end of the casting A.

The friction plate F is a flat rectangular plate and is interposed between the two relatively stationary friction plates E so as to provide an intercalated friction plate arrangement. Said plate F also slides between the sets of ribs 19—19 which act as guides therefor to limit the lateral play of the plate F. At its outer end, the plate F is provided with a series of perforations, through which are extended a plurality of pins 32—32, the extended ends of the pins 32 being seated in sockets 33—33 provided in the adjacent faces of the members C so that the plate F moves in unison with the members C not only in compression but also in release, thus insuring the return of the plate F to its normal position when the other parts of the friction mechanism are similarly restored.

The operation is as follows, assuming a compression stroke of the mechanism. As the pressure wedge-friction-shoes C are moved inwardly relatively to the casting A, friction will be generated on the surfaces 18 and 22 and those of the elements D and E, in the manner of a twin friction gear. The lateral pressure thus created will tend to force the friction plates E toward each other and in addition the plates E will tend to move toward each other, due to the longitudinal drag imposed upon said plates E by reason of the members D and plate F sliding inwardly longitudinally of the plates E. Due to the taper of the surfaces 18, a slight differential action will be created, advancing the wedge-friction-shoes D longitudinally at a slightly faster rate than that of the members C. The movement of all the friction elements referred to will be yieldingly resisted by the twin springs B—B, as will be understood. Upon removal of the actuating force, the members C are free to collapse with respect to the members D sufficiently to permit the springs B to project the twin sets of friction elements outwardly and as the latter are forced outwardly, the plate F will be retracted, inasmuch as the pressure thereon will be relieved because of the twin sets of friction devices. From the preceding description, considered in connection with the drawing, it will be noted that the friction shell is in reality, divided into twin friction chambers by the central intermediate partition formed by the two plates E and that I obtain additional frictional capacity by making the central partition in section separated to accommodate the plate F therebetween and without unduly enlarging the mechanism or weight of the parts entering into it.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell divided into twin friction chambers by an intermediate multiple-element partition; of twin arranged friction means in said chambers; a spring resistance; and a friction element between the twin arranged friction means and movable with the latter, said friction element frictionally cooperating with said elements of the partition.

2. In a friction shock absorbing mechanims, the combination with a friction shell divided into twin friction chambers by an intermediate multiple-element partition; of twin arranged friction means in said chambers; a spring resistance; a friction element between the twin arranged friction means and movable with the latter, said friction element frictionally cooperating with said elements of the partition; and means for attaching said friction element to members of said twin friction means for retracting said friction element during release.

3. In a friction shock absorbing mechanism, the combination with a friction shell divided into twin friction chambers by an intermediate multiple-element partition; of twin arranged spring means in said chambers; a spring resistance; a friction element between the twin arranged friction means and movable with the latter, said friction element frictionally cooperating with said elements of the partition; and cooperable rearwardly and inwardly directed wedging means on the shell and said partition elements arranged to press the latter toward each other upon tendency to move said partition elements inwardly of the shell.

4. In a friction shock absorbing mechanism, the combination with a friction shell; of a two-element intermediate partition within said shell dividing the latter into twin chambers, said partition elements being laterally separated; cooperable wedging means on the shell and said partition elements; a longitudinally movable friction plate slidable between and frictionally cooperable with said partition elements; a spring resistance; and friction means in each of said chambers.

5. In a friction shock absorbing mechanism, the combination with a friction shell; of a plurality of alternated relatively longitudinally stationary and longitudinally movable friction plates carried by said shell; rearwardly and inwardly extending cooperable wedge faces on the shell and said movable friction plates adapted to increase the effective pressure between said stationary and movable friction plates during relative longitudinal movement thereof during a compression stroke of the mechanism; and a spring resistance.

6. In a friction shock absorbing mechanism, the combination with a friction shell having opposed friction surfaces converging inwardly of the shell and an intermediate multiple-element partition dividing the shell into chambers; of twin arranged wedge-friction means in said chambers; a spring resistance; and a friction element between said twin arranged friction means and movable in unison with the latter, said friction element frictionally cooperating with said elements of the partition.

7. In a friction shock absorbing mechanism, the combination with a combined friction shell and spring cage casting; of a two-part intermediate partition within said shell, the parts of said partition being laterally separated; cooperable wedge means on said shell and said partition parts, said wedge means being directed inwardly of the mechanism; a set of wedge-friction-creating means between said partition and each opposed friction surface of the shell; twin arranged spring resistances within said cage portion of the casting; and a friction plate movable in unison with said twin arranged friction means and slidable between and frictionally cooperable with said partition elements.

In witness that I claim the foregoing I have hereunto subscribed my name this 1st day of July 1922.

JOHN F. O'CONNOR.

Witnesses:
 UNA C. GRIGSBY,
 ANN BAKER.